(12) United States Patent
LeBlanc et al.

(10) Patent No.: US 10,495,779 B2
(45) Date of Patent: Dec. 3, 2019

(54) DOWNHOLE SENSING CABLE SYSTEM FOR IMPROVED SEISMIC ENERGY COUPLING TO THE CABLE SYSTEM

(71) Applicant: Halliburton Energy Services, Inc., Houston, TX (US)

(72) Inventors: Michel Joseph LeBlanc, Houston, TX (US); Mark Elliott Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 190 days.

(21) Appl. No.: 15/573,942

(22) PCT Filed: Dec. 21, 2016

(86) PCT No.: PCT/US2016/068052
§ 371 (c)(1),
(2) Date: Nov. 14, 2017

(87) PCT Pub. No.: WO2018/118046
PCT Pub. Date: Jun. 28, 2018

(65) Prior Publication Data
US 2018/0292569 A1 Oct. 11, 2018

(51) Int. Cl.
*G01V 8/16* (2006.01)
*G01B 11/16* (2006.01)
*G01D 5/353* (2006.01)

(52) U.S. Cl.
CPC .............. *G01V 8/16* (2013.01); *G01B 11/16* (2013.01); *G01D 5/353* (2013.01)

(58) Field of Classification Search
CPC ........... G01V 8/16; G01D 5/353; G01B 11/16
See application file for complete search history.

(56) References Cited

U.S. PATENT DOCUMENTS

| 6,009,216 A * | 12/1999 | Pruett | E21B 17/206 219/502 |
| 7,409,858 B2 * | 8/2008 | Dria | E21B 17/206 73/152.33 |

(Continued)

FOREIGN PATENT DOCUMENTS

WO 2016/108845 A1 7/2016

OTHER PUBLICATIONS

International Search Report and Written Opinion issued in related PCT Application No. PCT/US2016/068052 dated Sep. 7, 2017, 17 pages.

*Primary Examiner* — John Fitzgerald
(74) *Attorney, Agent, or Firm* — Benjamin Fite; Baker Botts L.L.P.

(57) ABSTRACT

A sensing system may comprise a deployment device having an optical fiber cable with a predetermined curvature or an intrinsic curvature. The sensing system may be deployed into a location that is remote or difficult to navigate, for example, a large vessel or a borehole of a well. A deployment device may deploy the optical fiber cable and a tension control tool may maintain the deployment device along with the optical fiber cable in a straight or non-curved shape until the optical fiber cable has reached a predetermined location or position. A force may then be applied to the optical fiber cable to cause a portion of the optical fiber cable to contact an interior wall of the area or location, for example, a borehole or the deployment device. Measurements may be retrieved from the optical fiber cable, for example, measurements used in distributed acoustic sensing in vertical seismic profiling.

28 Claims, 6 Drawing Sheets

(56) References Cited

U.S. PATENT DOCUMENTS

| | | | | |
|---|---|---|---|---|
| 7,852,708 | B2* | 12/2010 | Poitzsch | G01V 1/38 367/19 |
| 9,798,023 | B2* | 10/2017 | Vigneaux | G01V 1/42 |
| 2003/0179651 | A1 | 9/2003 | Nutt et al. | |
| 2007/0125163 | A1* | 6/2007 | Dria | E21B 17/206 73/152.18 |
| 2011/0247816 | A1 | 10/2011 | Carter, Jr. | |
| 2014/0034301 | A1 | 2/2014 | LeBlanc | |
| 2016/0076325 | A1 | 3/2016 | Dykstra et al. | |

\* cited by examiner

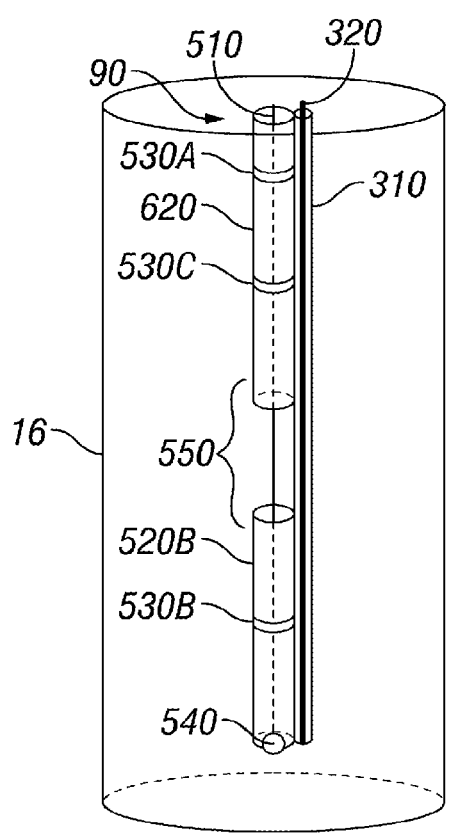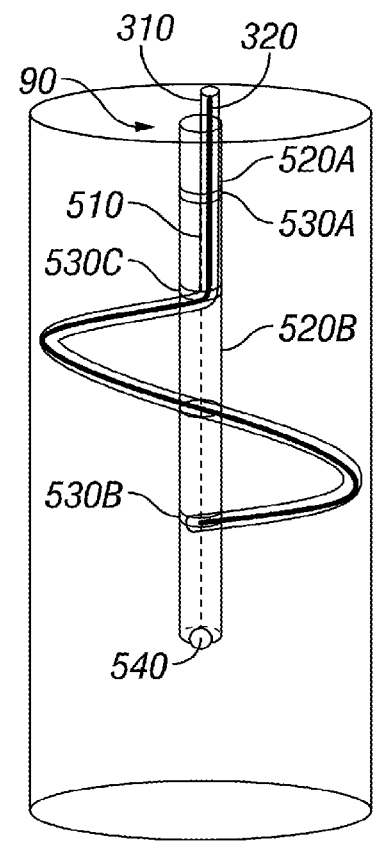
FIG. 6A   FIG. 6B

DOWNHOLE SENSING CABLE SYSTEM FOR IMPROVED SEISMIC ENERGY COUPLING TO THE CABLE SYSTEM

CROSS-REFERENCE TO RELATED APPLICATION

The present application is a U.S. National Stage Application of International Application No. PCT/US2016/068052 filed Dec. 21, 2016, which is incorporated herein by reference in its entirety for all purposes.

BACKGROUND

The present disclosure relates generally to well drilling and completion operations, well logging, and petroleum resources reservoir characterization and monitoring. More particularly, this disclosure relates to improved seismic energy coupling to a cable system, for example, a cable system that includes one or more fiber optic lines, such cable system used for performing diagnostics or monitoring of hydrocarbon systems, such as oil and gas wells or other tubular systems.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a borehole or a wellbore at a desired well site, treating the borehole or wellbore to optimize production of hydrocarbons, and performing the necessary steps to produce and process the hydrocarbons from the subterranean formation. The terms borehole or wellbore may be used interchangeably throughout the present disclosure.

Certain sensing systems (such as a distributed acoustic sensing (DAS) system) include measurement and logging devices or various tools that generate, receive, or detect data and information from distant locations. For example, DAS systems may utilize optical fiber cable as a sensing element and downhole seismic data and information is measured by an attached information handling system or an optoelectronic device. This data and information may, for instance, relate to the physical condition of a sensing system, the characteristics of a subterranean formation surrounding the borehole or sensing system, and proximate or surrounding temperature, acoustics, vibrations, or movement. A sensing system may transmit the data and information from the sensing system to information handling systems positioned at remote locations, for example, at a surface location associated with a borehole or a command center. A sensing system may receive data and information from one or more information handling systems. Implementation of a sensing system using optical fiber cable, such as DAS, may be difficult to the difficulty in ensuring good physical coupling between the optical fiber cable and the environment to be measured.

FIGURES

Some specific exemplary embodiments of the disclosure may be understood by referring, in part, to the following description and the accompanying drawings.

FIG. 6A is a diagram illustrating an example sensing system, according to one or more aspects of the present disclosure.

FIG. 6B is a diagram illustrating an example sensing system, according to one or more aspects of the present disclosure.

Figure 1:
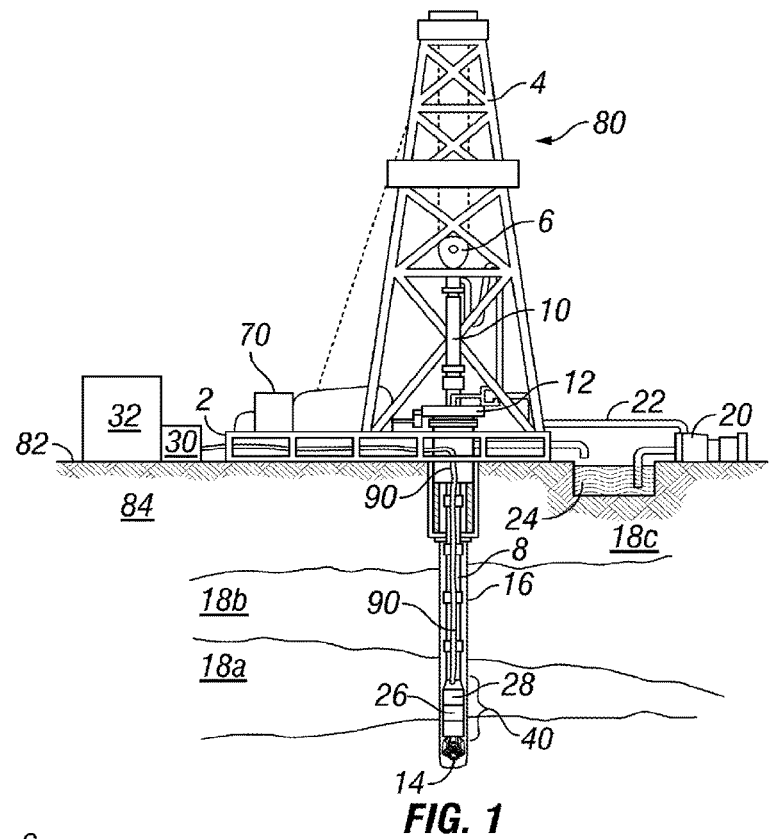
FIG. 1 is a diagram showing an illustrative drilling system, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Any one of the computer readable media mentioned above may store a set of instructions that, when executed by a processor communicably coupled to the media, cause the processor to perform certain steps of actions.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to distributed acoustic sensing (DAS) for Vertical Seismic Profiling. Additionally, embodiments of the present disclosure may be applicable to drilling operations that include, but are not limited to, target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, stimulation wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

In one or more embodiments, if a first device couples to a second device, that connection may be through a direct connection or through an indirect mechanical or electrical connection via other devices and connections. In one or more embodiments, devices that are communicatively coupled may be a connection that may be a wired or wireless connection such as, for example, Ethernet or LAN. Thus, if a first device communicatively couples to a second device, that connection may be through a direct connection, or through an indirect communication connection via other devices and connections.

According to aspects of the present disclosure, a sensing system may utilize optical fiber cable, cabling or lines to provide accurate and efficient transmission of data and information when deployed in remote locations, for extended or large distances or both. Acoustic energy may be transferred to an optical fiber cable from a surrounding medium by the effect the dynamic pressure of, for example, a fluid surrounding the optical fiber cable, has on the optical fiber cable or by the coupling of elastic strain from a solid (such as the deployment mechanism) with which the optical fiber cable is in contact and the optical fiber cable. Acoustic energy refers to vibrations or mechanical waves travelling in gases, liquids or solids and includes elastic waves in solids and dynamic pressure waves in fluids. For the detection of seismic waves that revel in the subsurface, the optical fiber cable is more responsive if the coupling takes place via elastic strain from a solid as opposed to via the effect of dynamic pressure. For example, optical fiber cable for DAS in vertical seismic profiling may be more responsive to seismic waves traveling in the surrounding subterranean formation when the optical fiber cable is in direct physical contact with, for example, the casing disposed in a borehole or wellbore. According to aspects of the present disclosure, a sensing system that includes an optical fiber cable provides for improved mechanical coupling to the object of interest. The sensing system includes a coupling between the optical fiber cable and the deployment mechanism to provide accurate detection, measurement or receipt of data and information. For example, ensuring that the optical fiber cable used for DAS touches or makes direct physical contact with the casing disposed within the borehole makes the sensing system more responsive to seismic waves the sensing system is configured or designed to detect. Any one or more sensing systems according to one or more embodiments may be easily expandable to any number of tools or devices, including, but not limited to, downhole tools.

Because DAS measures dynamic strain, detection of seismic signals in a wellbore which are created at the surface, in another well, or resulting from hydraulic fracture events (microseismic) requires strain coupling from the rock or formation to the optical fiber cable. For example, a composite slickline (a deployment device) with an optical fiber cable in the center may be used for DAS. The optical fiber cable has a good strain coupling to the deployment device but for the coupling of the optical fiber cable to the formation may require special attention. For example, if the optical fiber cable is suspended in a fluid in the middle of a wellbore, the acoustic wave (which is in the form of strain while travelling in the rock or formation) must first become a pressure wave in the fluid. The dynamic pressure must then cause strain in the deployment device before the optical fiber cable may be able to sense the dynamic pressure. The optical fiber cable is more sensitive when the optical fiber cable is in direct contact with or directly coupled to the deployment device, casing or the formation such that the acoustic energy may transfer to the optical fiber cable as strain conveyed via friction (at the interface of the casing, deployment device or formation) or adhered material layers (layers within the deployment device).

FIG. 1 is a diagram showing a subterranean drilling system 80 incorporating aspects of a sensing system. The drilling system 80 comprises a drilling platform 2 positioned at the surface 82 at or above a borehole 16. As depicted, the surface 82 comprises the top of a formation 84 containing one or more rock strata or layers for example, 18a, 18b, and 18c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 having a traveling block 6 for raising and lowering a drill string 8. The drill string 8 comprises drill pipe segments which may comprise one or more downhole tools. In one or more embodiments for a casing while drilling operation, drill string 8 may comprise a casing string rather than a conventional drill string. A sensing system 90 may, as depicted, be deployed in the drill string 8 when drilling operations are not being performed (the drilling string 8 is not being rotated) such as before a drilling operation begins or after a drilling operation is completed (for example, as part of a drill stem test). Sensing system 90 may also be deployed within an opening after removal of the drill string 8 from the borehole 16. For example, sensing system 90 may be ran inside drill string 8, a casing, a casing string, a tube, string, wireline, slickline, cable, or any other device or mechanism for deploying optical fiber cable. A spooling unit 70 may couple to sensing system 90 (for example, deployment device 310, optical fiber cable 320, or both illustrated in FIG. 3A) to control release of sensing system 90 or tension of the sensing system 90. While spooling unit 70 is shown at the surface 82, spooling unit 70 may be located at any suitable location at the surface 82 or downhole. Activation of the spooling unit 70 may be controlled by any suitable device or information handling system such as surface control unit 32. A kelly 10 may support the drill string 8 as it is lowered through a rotary table 12. A drill bit 14 may be coupled to the drill string 8 and driven by a downhole motor, rotation of the drill string 8 or both by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface 82 via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) 40 coupled to the drill string 8 near the drill bit 14. The BHA 40 may comprise various downhole measurement tools and sensors and LWD and MWD, for example, a tool 26. Tool 26 may be any type of downhole tool. As the bit extends the borehole 16 through the formations 18, the tool 26 may collect measurements relating to borehole 16 and the formation 84. The tools and sensors of the BHA 40 including the tool 26 may be communicably coupled to a downhole telemetry element 28. The downhole telemetry element 28 may be communicatively coupled to a surface telemetry element 30 through the sensing system 90. The surface telemetry element 30 may comprise, for instance, a transmitter (such as a laser diode) and one or more receivers. The surface and downhole telemetry elements 28 and 36, respectively, may cooperate to transfer measurements from tool 26 to the surface and/or to receive commands from the surface.

In certain embodiments, the drilling system 80 may comprise a surface control unit 32 positioned at the surface 82. The surface control unit 32 may comprise an information handling system communicably coupled to the surface telemetry elements 30 and may receive measurements from the tool 26 and/or transmit commands to the tool 26 though the surface telemetry elements 30. The surface control unit 32 may also receive measurements from the tool 26 when the tool 26 is retrieved at the surface 82. As is described above, the surface control unit 32 may process some or all of the measurements from the tool 26 to determine certain parameters of downhole elements, including the borehole 16 and formation 84.

Figure 2:
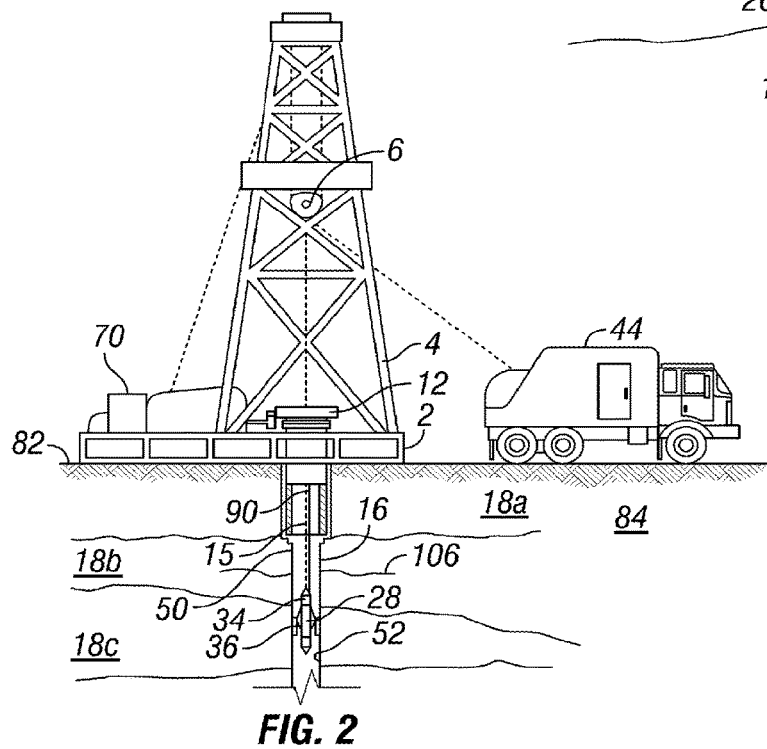
FIG. 2 is a diagram showing an illustrative wireline logging system, according to one or more aspects of the present disclosure.

At various times during the drilling process, the drill string 8 may be removed from the borehole 16 as shown in FIG. 2. In one or more embodiments a casing 50 may be disposed in the borehole 16. Once the drill string 8 has been removed, measurement/logging operations can be conducted using a wireline tool 34, for example, an instrument that is suspended into the borehole 16 by a cable 15 having conductors for transporting power to the tool and telemetry from the tool body to the surface 82. The wireline tool 34 may comprise sensing system 90, downhole logging and measurements tools as well as downhole telemetry element 36 similar to those described above or any other type of wireline tool. Sensing system 90 may couple to the downhole telemetry element 36. A downhole telemetry element 36 may be coupled to a surface telemetry element (not shown) through an optical waveguide within the cable 15. The surface telemetry element may be part of logging facility 44 or a separate device as illustrated in FIG. 1 as surface telemetry element 30. Spooling unit 70 operates the same as described with respect to FIG. 1 and may couple to a sensing system 90 (for example, deployment device 310 illustrated in FIG. 3A) to control release of the optical fiber cable or tension of the optical fiber cable. Such a spooling unit 70 may be located as part of the logging facility 44 or any suitable location at the surface 82 or downhole. Activation of the spool, for example, a spooling unit 70, may be controlled by any suitable device or information handling system such as logging facility 44. Spooling unit 70 may be located at any position at the surface 82 suitable for a given operation. A logging facility 44 (shown in FIG. 2 as a truck, although it may be any other structure) may include the surface telemetry elements and collect measurements from the downhole tools, and may include computing facilities (including, for example, a control unit/information handling system) for controlling, processing, storing, and/or visualizing some or all of the measurements gathered.

Figure 3A:
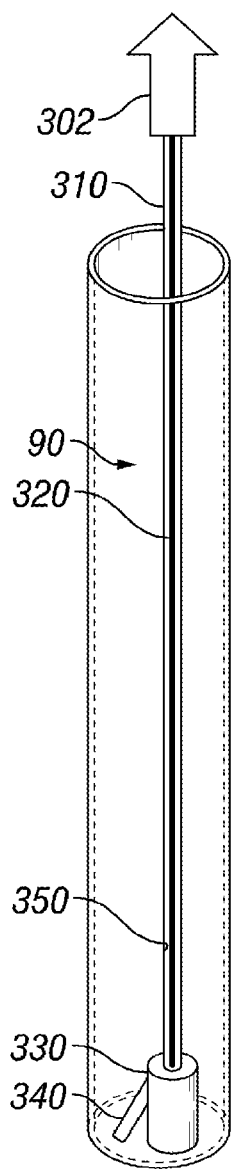
FIG. 3A is a diagram illustrating an example sensing system, according to aspects of the present disclosure.

FIG. 3A is a diagram illustrating an example sensing system, according to aspects of the present disclosure. In one or more embodiments, a sensing system 90 may comprise a deployment device 310 that comprises an optical fiber cable 320 and a tension control tool or device 330. For example, the tension control tool 330 may include one or more of a sinker bar, a clamping device, or both to engage the tension control tool 330 with the wellbore (for example, wellbore 16 of FIG. 1) to hold the tension control tool 330 at a location. Optical fiber cable 320 may comprise any fiber, cable, line or any other material that transmits light for communication. In one or more embodiments, the sensing system 90 may allow DAS vertical seismic profiles with a retrievable deployment device 310 and corresponding retrievable optical fiber cable 320. The sensing system 90 may be deployed in a borehole 16 as illustrated in FIG. 1 and FIG. 2 or on a ship, tunnel, or other location that extends for a large distance or difficult to access location and requires sensing measurements. A sensing measurement may comprise one or more of a temperature, pressure, vibration, acoustic or any other suitable sensing measurement or combination thereof. For example, a sensing system 90 may be deployed on a large vessel or ship for reliably detecting fires or temperatures that exceed a heat threshold. In one or more embodiments, sensing system 90 is DAS system that provides distributed strain sensing.

Deployment device 310 may comprise a primary DAS cable section with a predetermined or pre-established curvature. In one or more embodiments, the predetermined curvature may be at least at or about 0.5 meters$^{-1}$ (m$^{-1}$). Optical fiber cable 320 is mechanically coupled to the deployment device 310 at an upper end (for example, the end of the optical fiber cable 320 and the deployment device 310 closer to the surface 82) so that the axial strain changes in the deployment device 310 are well transferred to the optical fiber cable 320. The deployment device 310 may comprise a tube, string, wireline, cable or any other suitable cabling or mechanism for deploying optical fiber cable 320 according to one or more aspects of the present disclosure. In one or more embodiments, the optical fiber cable 320 may be mechanically coupled to the deployment device 310 in a "tight buffer" configuration as opposed to a "loose tube" configuration. In one or more embodiments, the deployment device 310 may comprise a fluid. For example, if the deployment device 310 is a tube, the tube may comprise a gel sufficiently viscous to allow good coupling of the optical fiber cable 320 to the deployment device 310 at a predetermined frequency or amplitude or both.

At a lower end of the deployment device 310 and optical fiber cable 320, a tension control tool 330 is coupled to the deployment device 310, the optical fiber cable 320 or both. For example, the tension control tool 330 may comprise a predetermined weight. The predetermined weight of the tension control tool 330 may be based, at least in part, on the type of deployment device 310, optical fiber cable 320, the predetermined location or position (for example, a predetermined depth, vertical placement, or horizontal placement) for placement of the optical fiber cable 320, the fluid present in the borehole 16 or any other factor or combination thereof. The weight of the tension control tool 330 applies a force on the deployment device 310 and the optical fiber cable 320 that causes the deployment device 310 and optical fiber cable 320 to be dispensed into the borehole 16 with a tension 302 that causes the deployment device 310 and the optical fiber cable 320 to remain substantially straight or not curved.

The tension control tool 330 may comprise a location control device 340. The location control device 340 prevents the tension control tool 330 from traversing further down the borehole 16 once a predetermined location or position for seismic coupling has been reached. In one or more embodiments, the location control device 340 may comprise a side arm or a clamp that may be deployed when the predetermined location or position is reached. For example, a control signal or telemetry signal may be sent from an information handling system (such as a surface control unit 32 or logging facility 44) located at the surface 82 to the tension control tool 330 that causes the location control device 340 to clamp to the borehole 16 or the deployment device 310. The control signal may be sent via the optical fiber cable 320 or any other transmission line coupled to the location control device 340.

Figure 3B:
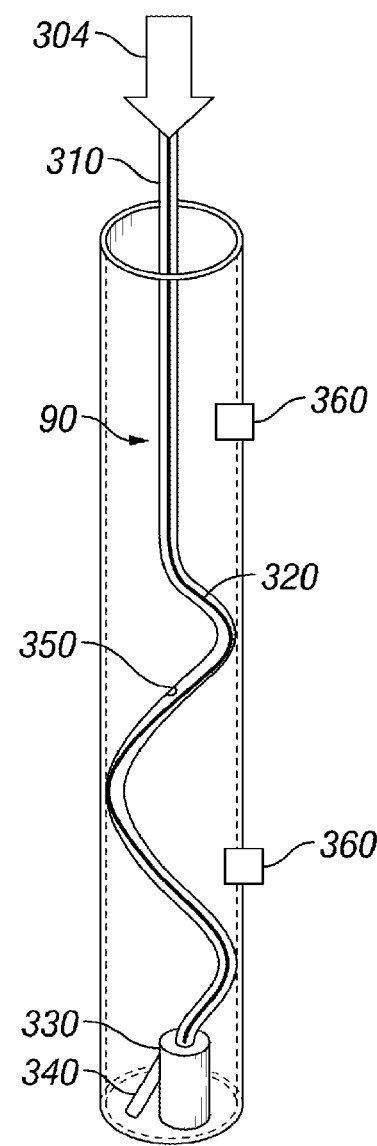
FIG. 3B is a diagram illustrating an example sensing system, according to aspects of the present disclosure.

As illustrated in FIG. 3B, in one or more embodiments, when the tension control tool 330 stops moving or downwardly traversing the borehole 16, a displacement or force 304 may be applied to the deployment device 310 that reduces the tension in deployment device 310 and forces one or more portions of the deployment device 310 to couple to or contact the borehole 16 or casing 50 and correspondingly may force the optical fiber cable 320 to couple to or contact an interior of a location, for example, interior wall 350 of the deployment device 310. For example, the deployment device 310 may be forced into a curvature-type shape by reducing tension in the deployment device 310 at the surface 82 so that the deployment device 310 and the corresponding optical fiber cable 320 buckles or bends and takes the shape that reduces strain energy which results in at least a portion of the deployment device 310 coupling to or contacting the borehole 16 or the casing 50 and correspondingly the optical fiber cable 320 coupling to or contacting the interior wall 350 of the deployment device 310. The sensing system 90 is advantageous as it improves the DAS signal which provides a more accurate reading or sensing measurement from the transmitted DAS signal via the optical fiber cable 320 as at least one portion of the deployment device 310 couples to or contacts the borehole 16 or casing 50 which corresponds to the optical fiber cable 320 coupling to or contacting the interior wall 350 of the deployment device 310. For example, once the deployment device 310 contacts the borehole 16 or the casing 50 and optical fiber cable 320 contacts the interior wall 350, one or more sensing measurements may be retrieved via the optical fiber cable 320.

In one or more embodiments, at least one portion of the deployment device 310 comprising the optical fiber cable 320 may be formed with a predetermined, inherent or natural curvature that is not zero (or not a straight line). For example, the optical fiber cable 320 may comprise a predetermined curvature of at least at or about $0.5 \text{ m}^{-1}$. When such deployment device 310 is maintained in a straight or non-curved position (the optical fiber cable 320 is not coupled to or contacting the interior wall 350) a strain energy in the portion of the deployment device 310 comprising the optical fiber cable 320 with the predetermined or pre-established curvature applies a force in opposition to the tension placed on the deployment device 310 by the tension control tool 330. The predetermined or pre-established curvature enhances the tendency for the deployment device 310 and correspondingly the optical fiber cable 320 to form a specific shape, for example, a uniform spiral as illustrated in FIG. 3B, when the force 304 is applied. For example, the tension control tool 330 may maintain a tension 302 in the deployment device 310 to overcome this strain energy caused by the predetermined curvature of the deployment device 310 to force the deployment device 310 and the corresponding optical fiber cable 320 to maintain a straight or sufficiently non-curved shaped so that the optical fiber cable 320 does not couple to or contact the interior wall 350 as illustrated in FIG. 3A. When the tension is released, for example, tension in the deployment device 310 comprising the optical fiber cable 320 is reduced by releasing more of the deployment device 310 from the surface 82, the portion of the deployment device 310 (along with the optical fiber cable 320) with the predetermined curvature is allowed to return to the shape of the predetermined curvature. This predetermined curvature shape is such that the optical fiber cable 320 couples to or contacts the interior wall 350 as illustrated in FIG. 3B.

If all of the deployment device 310 has a predetermined (or intrinsic) curvature, the optical fiber cable 320 has a tendency to couple to or contact the interior wall 350 anywhere along the deployment device 310. Once a portion of a section of the deployment device comprising optical fiber cable 320 is in physical connection (coupled to or in contact) with the borehole 16, that portion or section of the deployment device 310 may support the weight of any above portion or section of the deployment device 310 and prevent any below portion or section of the deployment device 310 (and corresponding optical fiber cable 320) from having any slack. Therefore, a bottom or lower section or portion of the deployment device 310 (far from or furthest from the surface 82 and close to or closest to the tension control tool 330) may have a tendency for curvature greater than any other portion or section of the deployment device 310.

The resulting shape of the deployment device 310 after the deployment device 310 is deployed downhole or at the predetermined location or position (for example, on a ship or within a borehole 16) may not be precisely determinable or knowable. This prevents a one-to-one relationship between the axial position of the deployment device 310 (or the optical fiber cable 320 or both) and the vertical position within the borehole 16 or deployed location. In one or more embodiments, an accurate vertical, horizontal or locational position is not necessary as the length of the deployment device 310 may be a short enough length as to be considered a single location for any data analysis. In one or more embodiments, where accurate vertical position is required, the speed of sound in the surrounding formation (for example, formation 84 in FIG. 1) as a function of depth may have been previously obtained (for example, using a conventional geophone string). This speed versus depth information may be used to correlate pulse arrival on the fiber optic cable (for example, fiber optic cable 320) with the known depth for the duration of the pulse travel. In this way, a map of the axial position along the fiber optic cable (which is determined by time of flight of the light in the optical fiber) versus depth in the formation may be created. In one or more embodiments, one or more transducers 360 (or sound emitters) are activated at one or more predetermined locations or positions where the one or more transducers 360 are positioned to be in close proximity to the optical fiber cable 320. For example, the transducer 360, part of a "wireless sensor network" installed behind casing or disposed within the interior of a location may be instructed to generate a sound wave for a predetermined period of time and the location of the transducer 360 may be identified by interpretation of the generated DAS optical signal transmitted via optical fiber cable 320 and collected at the surface (for example surface 82). In one or more embodiments, the geometry of the deployment device 310 may be modified at the region or location of interest so that a distributed acoustic signal has detectable features that enable a determination of the location of the optical fiber cable 320 relative to geometrical points of the deployment device 310 causing the detectable features in the distributed acoustic signal.

In one or more embodiments, the predetermined curvature of the deployment device 310 may be formed by spooling the deployment device 310 on a spooling unit 70 and then heating the spooling unit 70. The diameter of the spooling unit 70 may be configured, determined or set based, at least in part, on the predetermined curvature. Deployment device 310 comprising metal may plastically deform at relatively low strain values whereas deployment device 310 comprising composite fiber is linear elastic to failure and the matrix may be assumed linear elastic in the range of strain during operation. In one or more embodiments, deployment device 310 may comprise a graphite fiber or a carbon fiber with a matrix being a thermoplastic, for example, polyphenylene sulfide (PPS). The spooling unit 70 may be heated by an oven, a heat gun or any other suitable heating element or device. In one or more embodiments, the deployment device 310 may comprise metallic tube cable and the deployment device may be plastically deformed by winding the deployment device on a spooling unit 70 to create the curvature. The spooled deployment device 310 comprising the optical fiber cable 320 may next be spooled on a sheave or a pulley with a grooved wheel having a larger diameter than the spooling unit 70. High tension in the deployment device 310 may cause such a formed intrinsic curvature to be reduced or eliminated.

Once the deployment device 310 is forced into a shape that couples to or contacts the borehole 16 and the optical fiber cable 320 couples to or contacts the interior wall 350 (for example, as illustrated in FIG. 3B) the optical fiber cable is in position to measure dynamic or static strain changes imposed on the interior wall 350. For example, one or more sensing measurements from a downhole transducer (for example, transducer 360) with built-in acoustic transmitter may couple one or more information signals that may be transmitted via the optical fiber cable 320 to the surface 82 or to another tool or device deployed downhole or along with the sensing system 90. For example, in one embodiment, one or more sensing measurements may be transmitted or communicated to a telemetry element 28, surface telemetry element 30, downhole telemetry element 36, surface control unit 32, logging facility 44, any other processing or information handling system, any other tool or device at the surface 82 or within borehole 16, or any combination thereof that is communicatively coupled to the optical fiber cable 320. In one or more embodiments, one or more operations may be altered based, at least in part on any one or more sensing measurements including, but not limited to, any one or more of activating or de-activating a clamp (for example, tension control tool 330) or changing the position of the tension control tool 330. For example, in one or more embodiments, an alarm may be triggered when a sensing measurement exceeds a threshold, one or more sensing measurements may be displayed at a display at the surface 82, presented in a graph, chart or other presentation or stored for processing or retrieval at a later time or one or more sensing measurements from an electrical geophone may be converted to an optical signal and transmitted to the surface (for example, surface 82 of FIG. 1) for calibration purposes.

In one or more embodiments, the sensing system 90 may be disposed within a casing (for example, casing 50) that comprises one or more casing collars (not shown). The casing collars may be sensed by the optical fiber cable 320 and this sensed information may be used to determine or estimate a position (for example, a depth) at which a sensing measurement occurred.

Figure 4A:
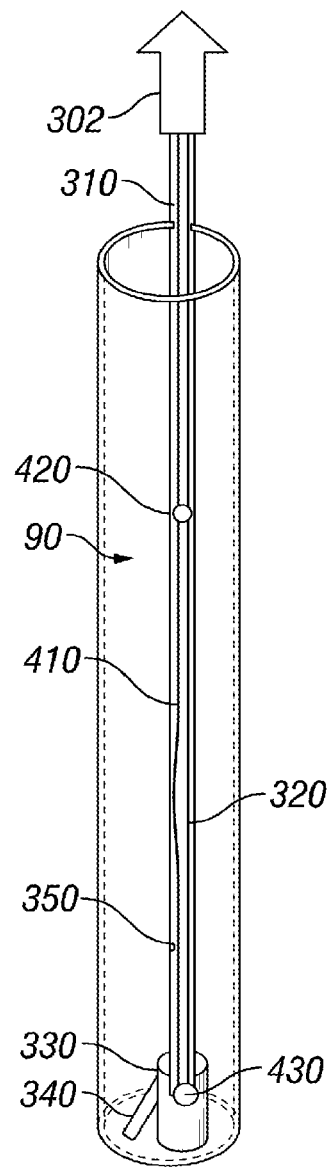
FIG. 4A is a diagram illustrating an example sensing system, according to one or more aspects of the present disclosure.

FIG. 4A illustrates an example sensing system according to one or more aspects of the present invention. In one or more embodiments, the deployment device 310 comprises a predetermined or intrinsic curvature. To ensure that the intrinsic curvature of the deployment device 310 is sufficient to pull any slack in the deployment device 310 and the corresponding optical fiber cable 320 (for example, slack introduced in the deployment device 310 from the surface 82) down into the location or borehole 16 for form a spiral as illustrated in FIG. 3B, a second cable, for example, tension cable 410, may be deployed. The tension cable 410 may be attached or coupled to the tension control tool 330 and the deployment device 310. The tension cable 410 may couple to the deployment device 310 or the deployment device 310 and the optical fiber cable 320 at a coupling 420. Coupling 420 may comprise any device for coupling the deployment device 310 with the tension cable 410. The tension cable 410 may couple to the tension control tool 330 at a winch 430. The winch 430 may comprise any device for coupling the tension cable 410 to the tension control tool 330 that allows the tension control tool 330 to apply a force to the tension cable 410 to induce or release tension in the tension cable 410. The tension cable 410 may apply a force that induces tension at the tension fiber 410 independently of any force applied to the deployment device 310. For example, the predetermined or pre-established curvature of the deployment device 310 along with the tension applied to the tension cable 410 cause a primary DAS section of the deployment device 310 to couple to or contact the borehole 16 and correspondingly for the optical fiber cable 320 to couple to or contact the interior wall 350 of the deployment device 310. In one or more embodiments, the tension cable 410 may be wrapped around the deployment device 310 so that when the tension cable 410 is retracted to make the tension cable 410 shorter than the deployment device 310, the tension cable 410 is straight while the deployment device 310 (or the primary section of the deployment device 310) along with the corresponding optical fiber cable 320 forms a spiral shape around the tension cable 410.

Figure 4B:
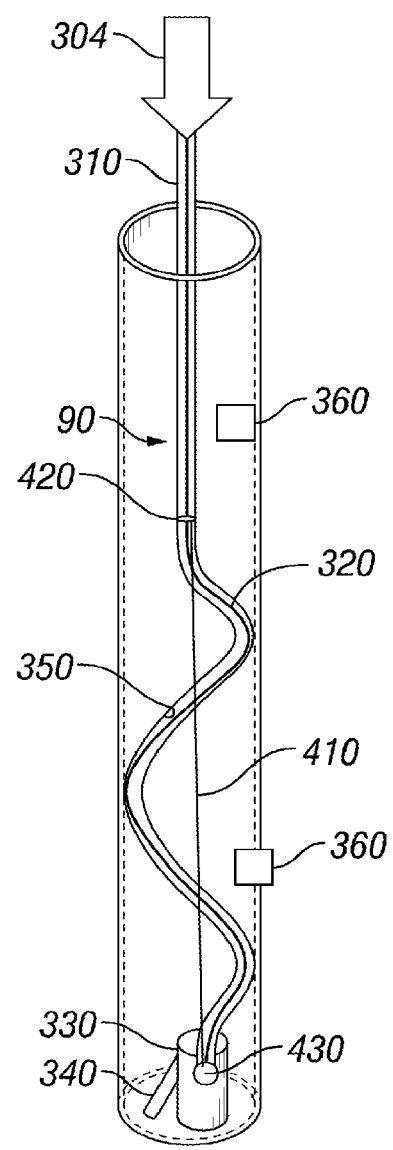
FIG. 4B is a diagram illustrating an example sensing system, according to one or more aspects of the present disclosure.

Once the location control device 340 of tension control tool 330 has been deployed (the predetermined location or position has been reached), the tension cable 410 may be retracted by the winch 430 to force the deployment device 310 into the predetermined shape (for example, a spiral shape) along with the corresponding optical fiber cable 320 as illustrated in FIG. 4B. In one or more embodiments, winch 430 comprises a suitable winch for retracting the tension cable 410. The winch 430 may be activated to cause a predetermined length of the tension cable 410 to be retracted. Simultaneously or at or near the same time that the winch 430 is activated, the spooling unit 70 may be activated to release tension on the deployment device 310 and the corresponding optical fiber cable 320, for example, by releasing more length of the deployment device 310 and correspondingly the optical fiber cable 320.

In one or more embodiments, the winch 430 comprises a spring-loaded winding spool. In such an embodiment, the spring-loaded winding spool may automatically retract or pull in a section or length of the tension cable 420 by a predetermined amount. For example, the spring-loaded winding spool of the winch 430 may be pre-wound prior to deploying the tension control tool 330. A control command may be transmitted to the tension control tool 330 via the optical fiber cable 320 or other line or cable to activate the retraction. The spring-loaded winding spool may retract the tension cable via a solenoid-driven ratcheted release.

In one or more embodiments, the winch 430 comprises a spring-loaded winding spool that continuously pulls or tends to retract the tension cable 410. The spring-loaded winding spool is given a rewind torque that is not greater than the effective weight of the tension control tool 330 in a fluid within the wellbore or borehole 16 (taking buoyant force into account) so that the tension cable 410 remains mostly straight or without curvature that contacts to the borehole 16 or casing 50. A control signal or command may be transmitted to the tension control tool 330 to cause the tension control tool 330 to extend the location control device 340. After this control signal is sent but before the tension control tool 330 is actually clamped or prevented from descending further down or onward, the weight of the tension control tool 330 is sufficient to keep the tension cable 410 under enough tension to prevent a significant curvature. Once the tension control tool 330 is stopped or clamped by the location control device 340, the spring-loaded winding spool tension is reduce and an amount of tension cable 410 is retracted while an amount of optical fiber cable 320 is released causing the optical fiber cable 320 to form a spiral or predetermined curvature shape so as to make contact with or couple to the borehole 16 or casing 50.

Figure 5A:
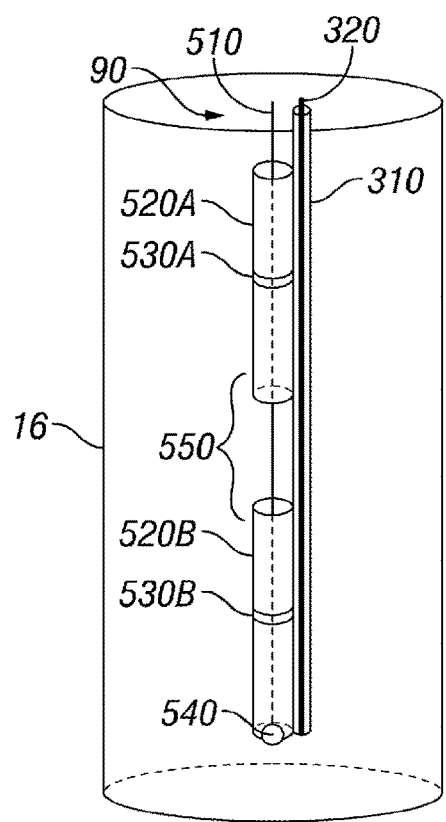
FIG. 5A is a diagram illustrating an example sensing system, according to one or more aspects of the present disclosure.
Figure 5B:
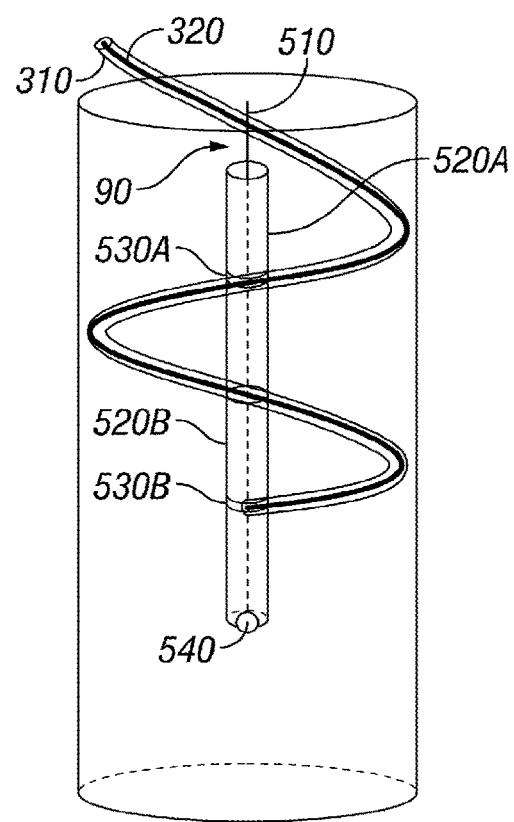
FIG. 5B is a diagram illustrating an example sensing system, according to one or more aspects of the present disclosure.

FIG. 5A and FIG. 5B are diagrams illustrating example sensing systems, according to one or more aspects of the present disclosure. As illustrated in FIG. 5A, in one or more embodiments a sensing system 90 comprising a deployment device 310 that comprises an optical fiber cable 320 is deployed within a borehole 16. The deployment device 310 or the deployment device 310 and the optical fiber cable 320 are coupled to or clamped to one or more shuttles 520, for example, upper shuttle 520A and bottom shuttle 520B at one or more clamping points. While only two shuttles 520 are illustrated in FIG. 5A, the present disclosure contemplates any number of shuttles 520. In one or more embodiments, shuttle 520 may comprise a tubular metal. In one or more embodiments, the deployment device 310 is clamped to a shuttle 520 via a clamp 530, for example, clamp 530A and 530B. While only one clamp 530 per shuttle 520 is illustrated, the present disclosure contemplates any number of clamps 530. In one or more embodiments, any number of shuttles 520 may be disposed between the upper shuttle 520A and the bottom shuttle 520B. The spacing 550 between the upper shuttle 520A and bottom shuttle 520B may provide slack in the optical fiber cable 320. This slack allows the deployment device 310 to form a predetermined or pre-established curvature or spiral shape as illustrated in FIG. 5B.

In one or more embodiments, a tug line 520 may be disposed or threaded through each shuttle 520. The tug line 510 is coupled to or otherwise tethered or fixed to a tug coupling or bottom point 540 of the bottom shuttle 530B. While tug line 510 is illustrated as coupled to the bottom of shuttle 520B, the present disclosure contemplates that tug line 510 may couple to any suitable portion or point of bottom shuttle 520B. As illustrated in FIG. 5B, when the tug line 510 is retracted or pulled up, the space or distance 550 between the shuttles 520 is eliminated or diminished such that the shuttles 520A and 520B touch or in contact with each other. As the deployment device 310 is coupled to the shuttles 520, the force of retraction of the tug line 510 forces the deployment device 310 to bend or spiral outward toward the borehole 16. In one or more embodiments, the deployment device 310 and the optical fiber cable 320 may comprise a predetermined curvature of at or about zero. A state of zero curvature or any pre-determined curvature of the deployment device 310 and the optical fiber cable 320 may be maintained by the weight or strain of the shuttles 520A and 520B, the lack of tension of the tug line 510 or any combination thereof. The tug line 510 may be retracted causing the shuttles 520A and 520B to contact, engage, or a separation distance between the shuttles 520A and 520B to be reduced such that the deployment device 310 and the optical fiber cable 320 are forced to form a curved shape. If deployment device 310 and optical fiber cable 320 already have a pre-set curvature, the operation of the shuttles 520A and 520B is enhanced by reducing the force required to cause the shuttles 520A and 520B to come together.

In one or more embodiments, the shuttles 520 may be deployed at any number of intervals along the entire length of the deployment device 310. In one or more embodiments, the length of the shuttles 520 and the number of clamps 530 or points where the deployment device 310 couples to the shuttles 520 may be spaced so as to cause the deployment device 310 to form a spiral shape at predetermined intervals. For example, the clamps 530 may be spaced twenty-five, thirty-five or fifty feet apart to create corresponding spirals or contact points with the borehole 16. The shuttles 520 may create a more uniform or predictable spiral shape as compared to other sensing systems 90. In one or more embodiments, the sensing system 90 of FIG. 5A and FIG. 5B may comprise a tension control tool 330 and may operate as described with respect to FIGS. 3A, 3B, 4A and 4B.

FIG. 6A and FIG. 6B are diagrams illustrating example sensing systems, according to one or more aspects of the present disclosure. The sensing system 90 of FIG. 6A comprises modified upper shuttle 620. For example, the modified upper shuttle 620 may comprise a length longer than the upper shuttle 520A. The modified upper shuttle 620 comprises two clamps, clamp 530A and clamp 530C. The clamps 530A and 530C maintain the deployment device 310 in a straight or linear or non-curved shape when the tug line 510 is retracted as illustrated in FIG. 6B. Only the portion of the deployment device 310 that is between the claim 530C and the clamp 530B is allowed to form the predetermined curvature, or intrinsic curvature or spiral shape as illustrated in FIG. 6B. While only one modified upper shuttle 620 is illustrated in FIG. 6A and FIG. 6B, any number of modified upper shuttles 620 may be deployed to space apart the spiral contact points of the deployment device 310 to the borehole 16. In one or more embodiments, the sensing system 90 of FIG. 6A and FIG. 6B may comprise a tension control tool 330 and may operate as described with respect to FIGS. 3A-4B.

Figure 7:
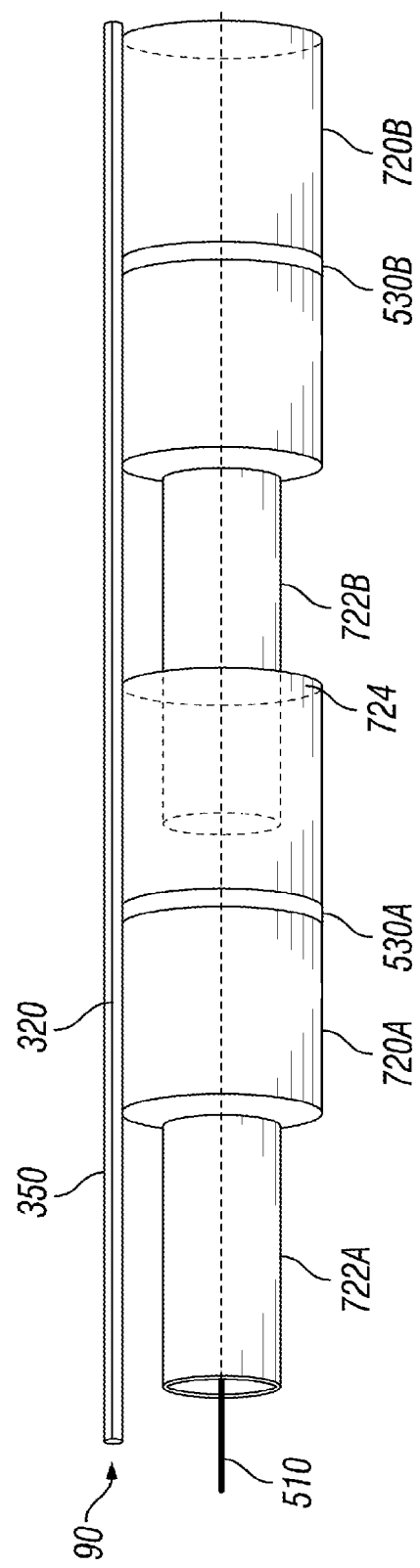
FIG. 7 is a diagram illustrating an example sensing system, according to one or more aspects of the present disclosure.

FIG. 7 is a diagram illustrating an example sensing system, according to one or more aspects of the present disclosure. In one or more embodiments, sensing system 90 may comprise a deployment device 310 or a deployment device 310 and an optical fiber cable 320 coupled to or clamped to one or more shuttles 720 via one or more clamps 530 or any other coupling device. The shuttles 720 comprise an opening or receptacle 724 for receiving a top portion 722 of another shuttle 720. For example, upper shuttle 720A may comprise an opening 724 for receiving a top portion 722B of bottom shuttle 720B. A tug line 510 may be deployed or threaded through the shuttles 720. While only two shuttles 720 are illustrated in FIG. 7, any number of shuttles 720 may be nested together. The receptacle 724 and the top portion 722 of a shuttle 720 provide alignment for the nesting of other shuttles 720. For example, top portion 722B may be disposed within opening 724 to align upper shuttle 720A and bottom shuttle 720B.

With respect to any one or more embodiments, the amount of deployment device 310 and corresponding optical fiber cable 320 required may be determined as follows:

$$CL = \text{sqrt}((vw*vw)+(2*\pi*bh*ns)^2), \quad \text{(Equation 1)}$$

where CL is the length between clamps 530, bh is the diameter of borehole 16, ns is the number of spirals or wraps around the borehole 16 between the shuttles, and vw is the desired vertical distance of the spiral in contact with the interior wall 350 or the borehole 16 after the tug line 510 is retracted or pulled up. For example, the spacing of clamps 530 for a first operation may be determined using Equation 1. for a DAS gauge length of fifteen meters, a suitable vertical distance of the optical fiber cable 320 that is in contact with the borehole 16 may be equal to thirty meters (vw=30 meters). A radius for a typical borehole may be three inches (bh=6 inches=01524 meters). The number of spiral wraps desired or required may be ten (ns=10) over the thirty meters of contact of the optical fiber cable 320 with the borehole 16. The distance between the clamping points on optical fiber cable 320 (CL) may then be determined to be CL=sqrt (30*30+(2*π*0.1524+10)*(2*π*0.1524*10)) =31.49 meters. The clamps 530 on the shuttles 720 may then be disposed 31.49 meters apart and the shuttles 720A and 720B would slide together by an amount determined by CL-vw (31.49-30=1.49 meters). This determined slidage of 1.49 meters amounts to about five percent contraction of the length of the deployment device 310 and the corresponding optical fiber cable 320. To obtain more spirals or predetermined curvature within the same vertical section, the contraction may be increased. To obtain fewer spirals or predetermined curvature within the same vertical section, the contraction may be reduced.

In one or more embodiments, the clamp 530 may allow a limited twisting of the deployment device 310 and the corresponding optical fiber cable 320 without damaging the deployment device 310 or the corresponding optical fiber cable 320. In one or more embodiments, an exterior housing, for example a rubber tubing, may be disposed about the shuttles 720 to prevent any fluid from entering the interior of the shuttles 720. For example, the deployment device 310 may be disposed outside this housing and the clamp 530 may protrude through the exterior of the housing to clamp or couple the deployment device 310 to the shuttle 720.

While a spiral shape for the optical fiber cable 320 is illustrated in the FIGS. 3B, 4B, 5B and 6B, the present disclosure contemplates any suitable shape for allowing one or more portions of the deployment device 310 and the corresponding optical fiber cable 320 to contact or couple to the borehole 16 and the interior wall 350, respectively.

In one or more embodiments, a method for retrieving one or more sensing measurements comprises disposing a sensing system comprising an optical fiber cable within an interior of a location to a predetermined position, wherein the optical fiber cable comprises a predetermined curvature, providing, by a tension control tool of the sensing system, a tension to the optical fiber cable to maintain the optical fiber cable in a non-curvature shape, wherein the tension control tool is coupled to the optical fiber cable, reducing the tension to the optical fiber cable, wherein reducing the tension causes one or more portions of the optical fiber cable to contact an interior wall of the location and retrieving the one or more sensing measurements via the optical fiber cable, wherein the one or more sensing measurements are associated with one or more characteristics of one or more positions of the location. In one or more embodiments, the method further comprises deploying a location control device of a tension control tool to position the sensing system at the predetermined location. In one or more embodiments, the method further comprises disposing a tension cable of the sensing system within the location, wherein the tension cable is coupled to the optical fiber cable at a coupling and wherein the tension cable is coupled to the tension control tool and applying a second tension by the tension control tool to the tension cable, wherein applying the second tension to the tension control cable causes at least one of the one or more portions of the optical fiber cable to contact the interior wall of the location. In one or more embodiments, the method further comprises disposing a first shuttle of the sensing system at a first clamping point of the optical fiber cable, wherein the first shuttle couples to the optical fiber cable at the first clamping point, disposing a second shuttle of the sensing system at a second clamping point of the optical fiber cable, wherein the second shuttle couples to the optical fiber cable at the second clamping point, and wherein the first shuttle and the second shuttle are spaced apart by a distance, disposing a tug line through the first shuttle and the second shuttle, wherein the tug line is coupled at a coupling of the second shuttle and retracting the tug line, wherein retracting the tug line decreases the distance between the first shuttle and the second shuttle causing the at least one of the one or more portions of the optical fiber cable to contact the interior wall of the location. In one or more embodiments, the first shuttle further couples to the optical fiber cable at a third clamping point, and wherein the optical fiber cable maintains the non-curvature shape between the first clamping point and the third clamping point. In one or more embodiments, the method further comprises aligning the first shuttle and the second shuttle by disposing a top portion of the second shuttle within a receptacle of the first shuttle. In one or more embodiments, the method further comprises communicating with one or more transducers disposed within the interior of the location and wherein the one or more transducers communicate the one or more sensing measurements to the fiber optic cable.

In one or more embodiments, a sensing system comprises a deployment device disposed within an interior of a location, an optical fiber cable disposed within the deployment device, wherein the optical fiber cable comprises a predetermined curvature, a spooling unit coupled to the deployment device, a tension control tool coupled to the deployment device, wherein the tension control tool and the spooling unit exerts a tension on the optical fiber cable to maintain the optical fiber cable in a non-curvature shape during deployment, and wherein the spooling unit releases the tension on the optical fiber cable to cause one or more portions of the optical fiber cable to contact an interior wall at the location and an information handling system communicatively coupled to the optical fiber cable, wherein the information handling system receives one or more sensing measurements from the optical fiber cable. In one or more embodiments, the sensing system further comprises a location control device of the tension control tool, wherein the location control device prevents the optical fiber cable from being disposed beyond a predetermined position of the location. In one or more embodiments, the sensing system further comprises a tension cable coupled to the optical fiber cable and the tension control tool, wherein tension applied to the tension cable causes at least one of the one or more portions of the optical fiber cable to contact the interior wall of the location. In one or more embodiments, the sensing system further comprises a first shuttle coupled to the optical fiber cable at a first clamping point, a second shuttle coupled to the optical fiber cable at a second clamping point, wherein the first shuttle and the second shuttle are spaced apart by a distance and a tug line disposed through the first shuttle and the second shuttle, wherein the tug line is coupled at a coupling of the second shuttle, wherein the tug line is retractable so as to decrease the distance between the first shuttle and the second shuttle to cause at least one of the one or more portions of the optical fiber cable to contact the interior wall of the location. In one or more embodiments, the first shuttle is further coupled to the optical fiber cable at a third clamping point, and wherein the optical fiber cable is maintained in a non-curvature shape between the first clamping point and the third clamping point. In one or more embodiments, the first shuttle comprises a receptacle, and wherein the second shuttle comprises a top portion for disposition within the receptacle. In one or more embodiments, the sensing system further comprises one or more transducers disposed within the interior of the location, wherein the one or more transducers communicate the one or more sensing measurements to the fiber optic cable.

In one or more embodiments, a downhole sensing system comprises a casing disposed within a borehole downhole, an optical fiber cable disposed within the casing, wherein the optical fiber cable comprises a predetermined curvature, a tension control tool coupled to the optical fiber cable, wherein the tension control tool maintains a tension on the optical fiber cable to maintain the optical fiber cable in a non-curvature shape, a spooling unit coupled to the optical fiber cable, wherein the spooling unit releases the optical fiber cable to release the tension on the optical fiber cable and to force one or more portions of the optical fiber cable to contact an interior wall of the casing and an information handling system communicatively coupled to the optical fiber cable, wherein the information handling system receives one or more sensing measurements from the optical fiber cable. In one or more embodiments, the downhole sensing system comprises a location control device of the tension control tool, wherein the location control device prevents the optical fiber cable from being disposed beyond a predetermined position of the casing. In one or more embodiments, the downhole sensing system further comprises a first shuttle coupled to the optical fiber cable at a first clamping point, a second shuttle coupled to the optical fiber cable at a second clamping point, wherein the first shuttle and the second shuttle are spaced apart by a distance and a tug line disposed through the first shuttle and the second shuttle, wherein the tug line is coupled at a coupling of the second shuttle, wherein the tug line is retractable to decrease the distance between the first shuttle and the second shuttle to cause at least one of the one or more portions of the optical fiber cable to contact the interior wall of the casing. In one or more embodiments, the first shuttle is further coupled to the optical fiber cable at a third clamping point, and wherein the optical fiber cable is maintained in a non-curvature shape between the first clamping point and the third clamping point. In one or more embodiments, the first shuttle comprises a receptacle, and wherein the second shuttle comprises a top portion for disposition within the receptacle. In one or more embodiments, the downhole sensing system further comprises one or more transducers disposed within the interior of the location, wherein the one or more transducers communicate the one or more sensing measurements to the fiber optic cable.

In one or more embodiments, a method for retrieving one or more sensing measurements comprising disposing a sensing system comprising an optical fiber cable within an interior of a location to a predetermined position, wherein the optical fiber cable comprises a predetermined curvature at or near zero, providing, by a tension control tool of the sensing system, a tension to the optical fiber cable to maintain the optical fiber cable in a non-curvature shape, wherein the tension control tool is coupled to the optical fiber cable, disposing a first shuttle of the sensing system at a first clamping point of the optical fiber cable, wherein the first shuttle couples to the optical fiber cable at the first clamping point, disposing a second shuttle of the sensing system at a second clamping point of the optical fiber cable, wherein the second shuttle couples to the optical fiber cable at the second clamping point, and wherein the first shuttle and the second shuttle are spaced apart by a distance, disposing a tug line through the first shuttle and the second shuttle, retracting the tug line, wherein retracting the tug line decreases the distance between the first shuttle and the second shuttle causing the at least one of the one or more portions of the optical fiber cable to contact the interior wall of the location and retrieving the one or more sensing measurements via the optical fiber cable, wherein the one or more measurements are associated with one or more characteristics of one or more positions of the location. In one or more embodiments, the method further comprises clamping the first shuttle to the optical fiber cable at a third clamping point, wherein the optical fiber cable is maintained in a non-curvature shape between the first clamping point and the third clamping point. In one or more embodiments, the method further comprises disposing, between the first shuttle and the second shuttle, a third shuttle of the sensing system at a third clamping point of the optical fiber cable, the tug line through the third shuttle, and wherein the third shuttle is spaced apart from the first shuttle at a first distance and from the second shuttle at a second distance and wherein retracting the tug line decreases at least one of the first distance and the second distance. In one or more embodiments, the method further comprises aligning the first shuttle and the second shuttle by disposing a top portion of the second shuttle within a receptacle of the first shuttle.

In one or more embodiments, the sensing system comprises a deployment mechanism disposed within an interior of a location, an optical fiber cable disposed within the deployment device, wherein the optical fiber cable comprises a curvature at or about zero, a first shuttle coupled to the optical fiber cable at a first clamping point, a second shuttle coupled to the optical fiber cable at a second clamping point, wherein the first shuttle and the second shuttle are spaced apart by a distance, a tug line disposed through the first shuttle and the second shuttle, wherein the tug line is coupled at a coupling of the second shuttle, wherein the tug line is retractable so as to decrease the distance between the first shuttle and the second shuttle to cause at least one of the one or more portions of the optical fiber cable to contact the interior wall of the location and an information handling system communicatively coupled to the optical fiber cable, wherein the information handling system receives one or more sensing measurements from the optical fiber cable. In one or more embodiments, the first shuttle is further coupled to the optical fiber cable at a third clamping point, and wherein the optical fiber cable is maintained in a non-curvature shape between the first clamping point and the third clamping point. In one or more embodiments, the first shuttle comprises a receptacle, and wherein the second shuttle comprises a top portion for disposition within the receptacle. In one or more embodiments, the sensing system further comprises a third shuttle disposed between the first shuttle and the second shuttle at a third clamping point of the optical fiber cable, wherein the tug line is disposed through the third shuttle, and wherein the third shuttle is spaced apart from the first shuttle at a first distance and from the second shuttle at a second distance, and wherein the tug line is retractable to decrease the first distance and the second distance.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A method for retrieving one or more sensing measurements, comprising:
   disposing a sensing system comprising an optical fiber cable within an interior of a location to a predetermined position, wherein the optical fiber cable comprises a predetermined curvature;
   providing, by a tension control tool of the sensing system, a tension to the optical fiber cable to maintain the optical fiber cable in a non-curvature shape, wherein the tension control tool is coupled to the optical fiber cable;
   reducing the tension to the optical fiber cable, wherein reducing the tension causes one or more portions of the optical fiber cable to contact an interior wall of the location; and
   retrieving the one or more sensing measurements via the optical fiber cable, wherein the one or more sensing measurements are associated with one or more characteristics of one or more positions of the location.

2. The method of claim 1, further comprising deploying a location control device of a tension control tool to position the sensing system at the predetermined location.

3. The method of claim 1, further comprising:
   disposing a tension cable of the sensing system within the location, wherein the tension cable is coupled to the optical fiber cable at a coupling and wherein the tension cable is coupled to the tension control tool; and
   applying a second tension by the tension control tool to the tension cable, wherein applying the second tension to the tension control cable causes at least one of the one or more portions of the optical fiber cable to contact the interior wall of the location.

4. The method of claim 1, further comprising:
   communicating with one or more transducers disposed within the interior of the location; and
   wherein the one or more transducers communicate the one or more sensing measurements to the fiber optic cable.

5. The method of claim 1, further comprising:
   disposing a first shuttle of the sensing system at a first clamping point of the optical fiber cable, wherein the first shuttle couples to the optical fiber cable at the first clamping point;
   disposing a second shuttle of the sensing system at a second clamping point of the optical fiber cable, wherein the second shuttle couples to the optical fiber cable at the second clamping point, and wherein the first shuttle and the second shuttle are spaced apart by a distance;
   disposing a tug line through the first shuttle and the second shuttle, wherein the tug line is coupled at a coupling of the second shuttle; and
   retracting the tug line, wherein retracting the tug line decreases the distance between the first shuttle and the second shuttle causing the at least one of the one or more portions of the optical fiber cable to contact the interior wall of the location.

6. The method of claim 5, wherein the first shuttle further couples to the optical fiber cable at a third clamping point, and wherein the optical fiber cable maintains the non-curvature shape between the first clamping point and the third clamping point.

7. The method of claim 5, further comprising aligning the first shuttle and the second shuttle by disposing a top portion of the second shuttle within a receptacle of the first shuttle.

8. A sensing system, comprising:
   a deployment device disposed within an interior of a location;
   an optical fiber cable disposed within the deployment device, wherein the optical fiber cable comprises a predetermined curvature;
   a spooling unit coupled to the deployment device;
   a tension control tool coupled to the deployment device, wherein the tension control tool and the spooling unit exerts a tension on the optical fiber cable to maintain the optical fiber cable in a non-curvature shape during deployment, and wherein the spooling unit releases the tension on the optical fiber cable to cause one or more portions of the optical fiber cable to contact an interior wall at the location; and
   an information handling system communicatively coupled to the optical fiber cable, wherein the information handling system receives one or more sensing measurements from the optical fiber cable.

9. The sensing system of claim 8, further comprising a location control device of the tension control tool, wherein the location control device prevents the optical fiber cable from being disposed beyond a predetermined position of the location.

10. The sensing system of claim 8, further comprising a tension cable coupled to the optical fiber cable and the tension control tool, wherein tension applied to the tension cable causes at least one of the one or more portions of the optical fiber cable to contact the interior wall of the location.

11. The sensing system of claim 8, further comprising one or more transducers disposed within the interior of the location, wherein the one or more transducers communicate the one or more sensing measurements to the fiber optic cable.

12. The sensing system of claim 8, further comprising:
a first shuttle coupled to the optical fiber cable at a first clamping point;
a second shuttle coupled to the optical fiber cable at a second clamping point, wherein the first shuttle and the second shuttle are spaced apart by a distance; and
a tug line disposed through the first shuttle and the second shuttle, wherein the tug line is coupled at a coupling of the second shuttle, wherein the tug line is retractable so as to decrease the distance between the first shuttle and the second shuttle to cause at least one of the one or more portions of the optical fiber cable to contact the interior wall of the location.

13. The sensing system of claim 12, wherein the first shuttle is further coupled to the optical fiber cable at a third clamping point, and wherein the optical fiber cable is maintained in a non-curvature shape between the first clamping point and the third clamping point.

14. The sensing system of claim 12, wherein the first shuttle comprises a receptacle, and wherein the second shuttle comprises a top portion for disposition within the receptacle.

15. A downhole sensing system comprising:
a casing disposed within a borehole downhole;
an optical fiber cable disposed within the casing, wherein the optical fiber cable comprises a predetermined curvature;
a tension control tool coupled to the optical fiber cable, wherein the tension control tool maintains a tension on the optical fiber cable to maintain the optical fiber cable in a non-curvature shape;
a spooling unit coupled to the optical fiber cable, wherein the spooling unit releases the optical fiber cable to release the tension on the optical fiber cable and to force one or more portions of the optical fiber cable to contact an interior wall of the casing; and
an information handling system communicatively coupled to the optical fiber cable, wherein the information handling system receives one or more sensing measurements from the optical fiber cable.

16. The downhole sensing system of claim 15, further comprising:
a location control device of the tension control tool, wherein the location control device prevents the optical fiber cable from being disposed beyond a predetermined position of the casing.

17. The downhole sensing system of claim 15, further comprising one or more transducers disposed within the interior of the location, wherein the one or more transducers communicate the one or more sensing measurements to the fiber optic cable.

18. The downhole sensing system of claim 15, further comprising:
a first shuttle coupled to the optical fiber cable at a first clamping point;
a second shuttle coupled to the optical fiber cable at a second clamping point, wherein the first shuttle and the second shuttle are spaced apart by a distance; and
a tug line disposed through the first shuttle and the second shuttle, wherein the tug line is coupled at a coupling of the second shuttle, wherein the tug line is retractable to decrease the distance between the first shuttle and the second shuttle to cause at least one of the one or more portions of the optical fiber cable to contact the interior wall of the casing.

19. The downhole sensing system of claim 18, wherein the first shuttle is further coupled to the optical fiber cable at a third clamping point, and wherein the optical fiber cable is maintained in a non-curvature shape between the first clamping point and the third clamping point.

20. The downhole sensing system of claim 18, wherein the first shuttle comprises a receptacle, and wherein the second shuttle comprises a top portion for disposition within the receptacle.

21. A method for retrieving one or more sensing measurements, comprising:
disposing a sensing system comprising an optical fiber cable within an interior of a location to a predetermined position, wherein the optical fiber cable comprises a predetermined curvature at or near zero;
providing, by a tension control tool of the sensing system, a tension to the optical fiber cable to maintain the optical fiber cable in a non-curvature shape, wherein the tension control tool is coupled to the optical fiber cable;
disposing a first shuttle of the sensing system at a first clamping point of the optical fiber cable, wherein the first shuttle couples to the optical fiber cable at the first clamping point;
disposing a second shuttle of the sensing system at a second clamping point of the optical fiber cable, wherein the second shuttle couples to the optical fiber cable at the second clamping point, and wherein the first shuttle and the second shuttle are spaced apart by a distance;
disposing a tug line through the first shuttle and the second shuttle, wherein the tug line is coupled at a coupling of the second shuttle;
retracting the tug line, wherein retracting the tug line decreases the distance between the first shuttle and the second shuttle causing the at least one of the one or more portions of the optical fiber cable to contact the interior wall of the location; and
retrieving the one or more sensing measurements via the optical fiber cable, wherein the one or more measurements are associated with one or more characteristics of one or more positions of the location.

22. The method of claim 21, further comprising clamping the first shuttle to the optical fiber cable at a third clamping point, wherein the optical fiber cable is maintained in a non-curvature shape between the first clamping point and the third clamping point.

23. The method of claim 21, further comprising:
disposing, between the first shuttle and the second shuttle, a third shuttle of the sensing system at a third clamping point of the optical fiber cable, the tug line through the third shuttle, and wherein the third shuttle is spaced apart from the first shuttle at a first distance and from the second shuttle at a second distance; and wherein retracting the tug line decreases at least one of the first distance and the second distance.

24. The method of claim 21, further comprising aligning the first shuttle and the second shuttle by disposing a top portion of the second shuttle within a receptacle of the first shuttle.

25. A sensing system, comprising:
a deployment mechanism disposed within an interior of a location;
an optical fiber cable disposed within the deployment device, wherein the optical fiber cable comprises a curvature at or about zero;
a first shuttle coupled to the optical fiber cable at a first clamping point;
a second shuttle coupled to the optical fiber cable at a second clamping point, wherein the first shuttle and the second shuttle are spaced apart by a distance;
a tug line disposed through the first shuttle and the second shuttle, wherein the tug line is coupled at a coupling of the second shuttle, wherein the tug line is retractable so as to decrease the distance between the first shuttle and the second shuttle to cause at least one of the one or more portions of the optical fiber cable to contact the interior wall of the location; and
an information handling system communicatively coupled to the optical fiber cable, wherein the information handling system receives one or more sensing measurements from the optical fiber cable.

26. The sensing system of claim 25, wherein the first shuttle is further coupled to the optical fiber cable at a third clamping point, and wherein the optical fiber cable is maintained in a non-curvature shape between the first clamping point and the third clamping point.

27. The sensing system of claim 25, wherein the first shuttle comprises a receptacle, and wherein the second shuttle comprises a top portion for disposition within the receptacle.

28. The sensing system of claim 25, further comprising a third shuttle disposed between the first shuttle and the second shuttle at a third clamping point of the optical fiber cable, wherein the tug line is disposed through the third shuttle, and wherein the third shuttle is spaced apart from the first shuttle at a first distance and from the second shuttle at a second distance, and wherein the tug line is retractable to decrease the first distance and the second distance.

* * * * *